UNITED STATES PATENT OFFICE.

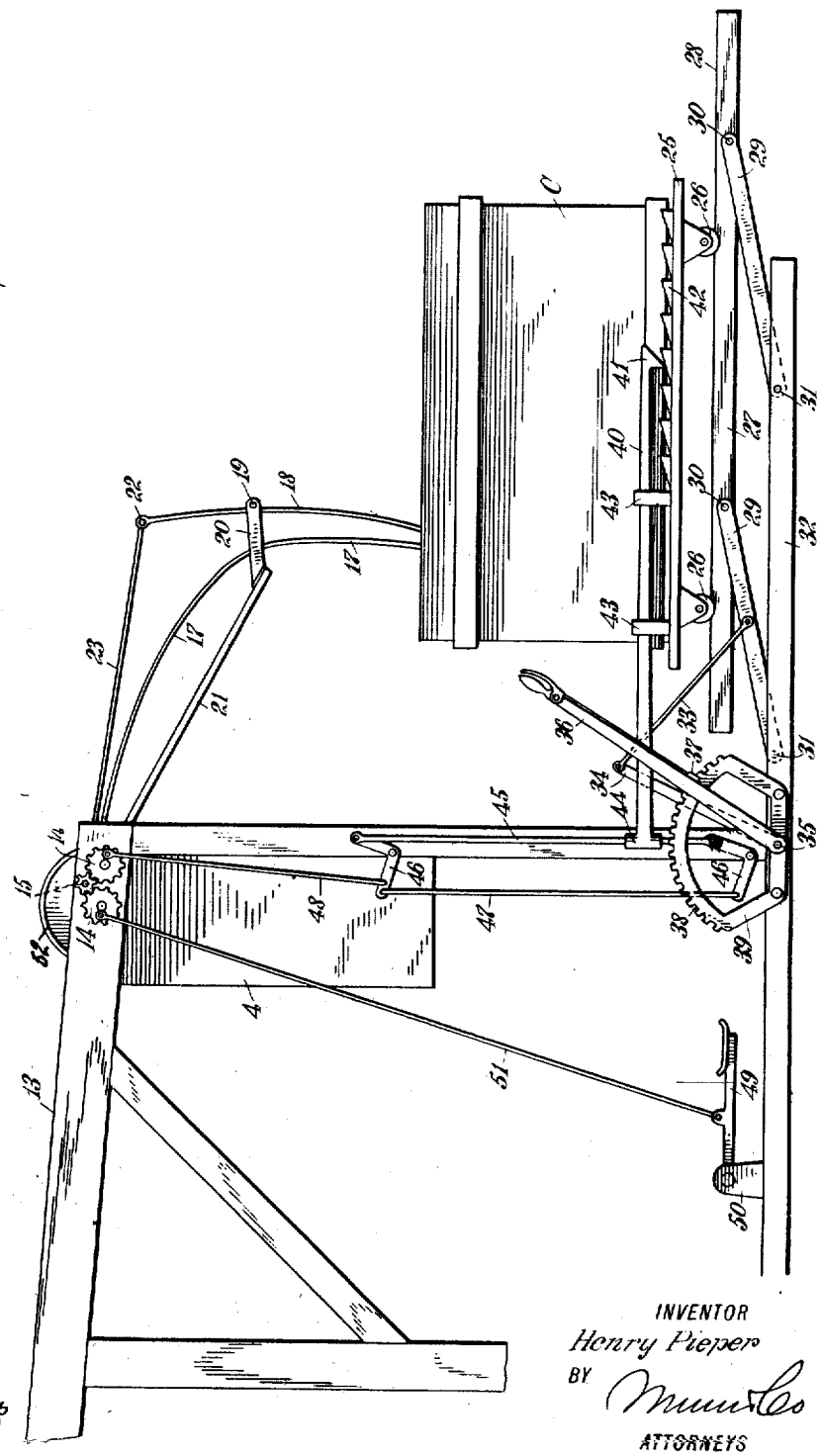

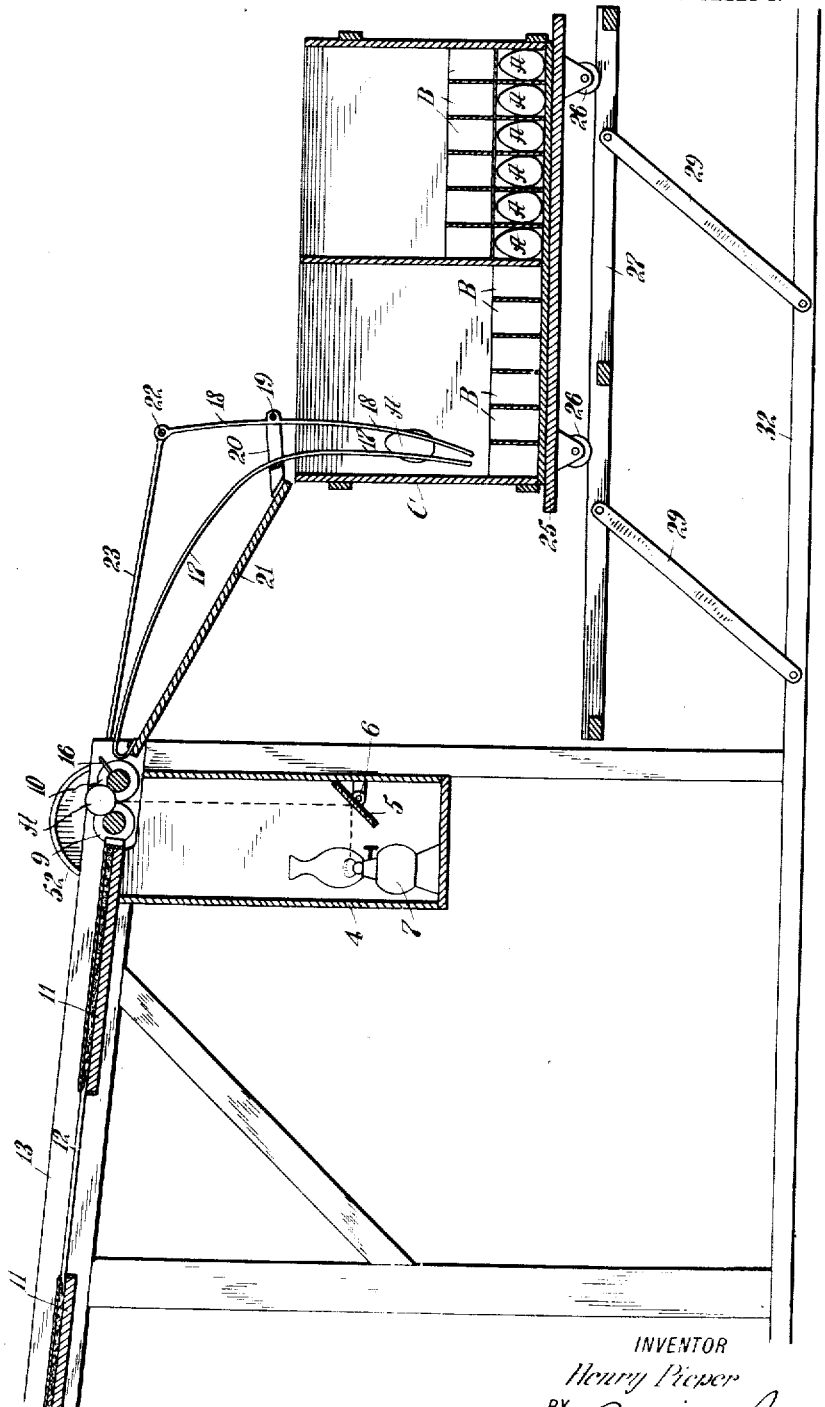

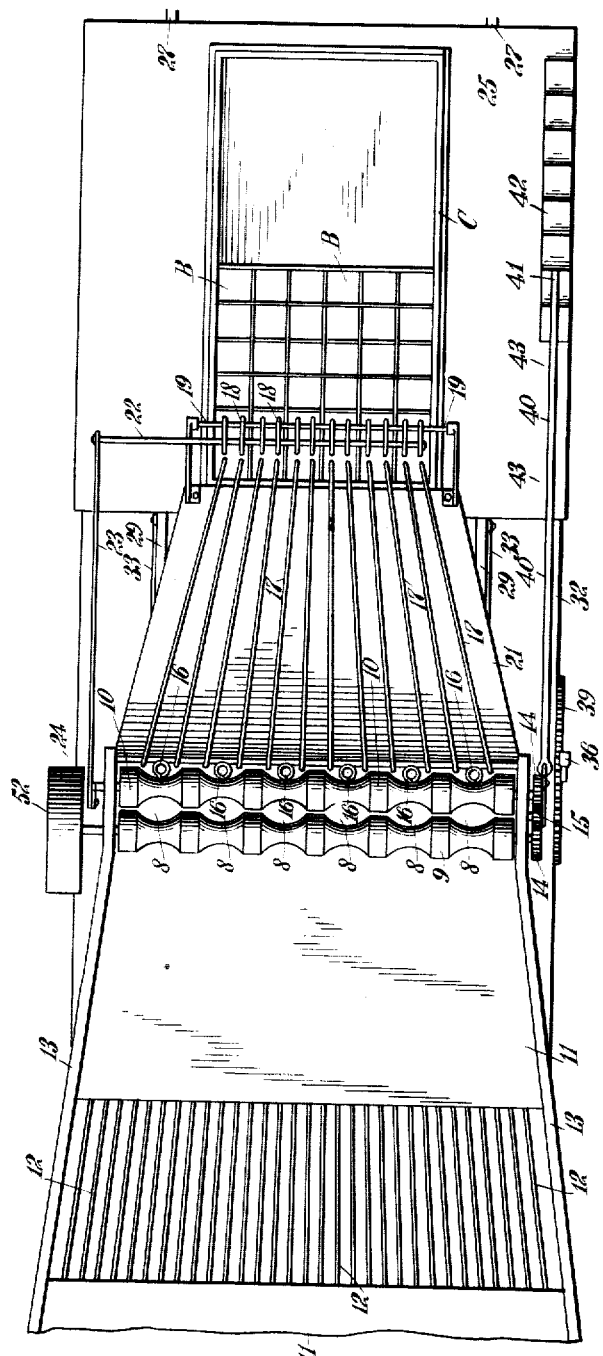

HENRY PIEPER, OF UEHLING, NEBRASKA.

EGG CANDLING AND PACKING MACHINE.

952,352.   Specification of Letters Patent.   Patented Mar. 15, 1910.

Application filed October 20, 1909. Serial No. 523,568.

*To all whom it may concern:*

Be it known that I, HENRY PIEPER, a citizen of the United States, and a resident of Uehling, in the county of Dodge and State of Nebraska, have invented a certain new and useful Egg Candling and Packing Machine, of which the following is a full, clear, and exact description.

Among the principal objects of the present invention are: to provide a machine constructed and arranged to hold for a short period of time, the eggs being treated in position to be subjected to a light test for decomposition; to provide a machine which will automatically pack eggs in suitable receptacles; and to provide a machine of the character specified which is simple and durable of construction and requires the attention of one operator only.

One embodiment of the invention is disclosed in the construction illustrated in the accompanying drawings forming a part of this specification, in which—

Figure 1 is a side elevation of a machine constructed in accordance with the present invention; Fig. 2 is a vertical longitudinal section of the same; and Fig. 3 is a plan view of the same.

The form of test used in the present machine for detecting decomposition in eggs, is that known as the light test. For this purpose a box-like receptacle 4 is provided with a series of inclined mirrors 5 pivotally mounted at 6 at the one side of the box 4. A lamp 7 is suitably mounted within the box 4, and the various mirrors are adjusted with reference to the light produced thereby to deflect the rays therefrom through the openings 8, 8, formed between the rollers 9, 10. The rollers 9, 10, are formed to the shape illustrated in Fig. 3, to form the openings 8, 8, as shown.

The eggs are delivered to the rollers 9, 10, to rest over the openings 8, 8, by an inclined platform 11. Intermediate the upper and lower end of the platform 11 is an open space, bridged by a series of parallel wires 12, 12. The wires 12, 12, are disposed in parallel arrangement, being separated a desired distance, sufficient to support the egg without any considerable deflection from its rolling path. The purpose of the screen formed by the said wires 12 is to pass any bran, straw, or other packing material which may have adhered to the eggs, after being packed for transit. The platform 11 is provided with the sides 13, 13, raised above the platform at a suitable height. The platform and sides 13 are suitably covered or padded with a material suitable to avoid fracturing the egg shell.

At the lower end of the platform 11 the edge is serrated to form leading extensions for delivering the eggs to the rollers 9, 10. The rollers 9, 10, are provided with gear wheels 14, 14, of equal diameter, which are operatively connected by the pinion 15. By reason of this gear connection, the rollers 9 and 10 are rotated in the same rotary direction. The direction of rotation at the top of the said rollers is outward from the platform 11.

The material from which the roller 9 is constructed varies to suit the demands of the trade. The surface is covered with any soft yielding material having slight adhesive quality, such as leather, adapted to lift the egg over the said roller 9. The body of the roller 10 is constructed in the same manner, while the covering is preferably formed from a soft non-adhesive material, such as felt, which will not carry the egg over the said roller. The eggs are lifted over the said roller by the extensions 16, 16 set out from the side of the roller 10 and extended from the waist of the reduced sections of the said roller. The extensions 16 are arranged and formed so that they lift the eggs when coming in contact therewith, and carry the same up over the roller 10, to be delivered to the chute formed by the guide wires 17, 17. The wires 17, 17, are separated to form runways for the eggs, supporting the same above the center of rotation thereof. The wires 17 are contracted at their lower ends to register with the cells B— B— of the paper, or other filler for the box C, in which the eggs are delivered.

About midway of the length of the wires 17, vertically extended to cause the eggs to maintain their position, relative to the said wires, there are provided guide rods 18, which are fixedly mounted upon the rocking bar 19. The bar 19 is pivoted in brackets 20, extended from an apron 21, mounted upon the frame of the machine, substantially as shown at Figs. 1 and 3 of the drawings. The rods 18 are connected at the upper end to a rod 22, to the extended end of which is connected a pull rod 23. The pull rod 23 is pivotally connected to a crank arm 24, mounted on the shaft of the roller 10.

By means of this arrangement, whenever the roller 10 is rotated, the rods 18 are caused to rock on the shaft 19 to cause the lower ends of the rods 18 to approach and recede from the lower end of the wire 17. This action of the rods 18 forms gradually opening contracted passages for the slow delivery of the eggs beyond the rocking bar.

As above stated, the assembled wires 17 and rods 18 form passageways for the delivery of the eggs from the roller 10 to deposit the same in the cells B, B, of the filler which is placed in the box C. For this purpose the wires and rods are arranged with reference to the fillers for the box C, there being as many of the passageways as there are cells, in line transversely with the box C. The box C is located upon the table 25, which is mounted upon flanged rollers 26, 26, adapted to track on the side rails 27 of the elevator 28. The purpose of the elevator 28 is to raise and lower to accommodate the varying height of the successive layers of fillers. For this purpose the elevator is mounted upon the link arms 29, 29. The link arms 29, 29, are pivoted at 30, 30, to the elevator 28, and at 31, 31, to rails 32, suitably secured to the frame of the machine. To the side of the link arm 29 nearest the frame of the machine, carrying the platform 11, is secured a tie rod 33, the opposite end of which is pivotally connected with the rocking arm 34. The arm 34 is fixedly connected to the shaft 35 upon the outer end of which is mounted the hand lever 36. Upon the hand lever 36 is slidably mounted a grip release detent 37, adapted to become tooth-engaged with the teeth 38 of the quadrant 39, which is fixedly mounted upon the rail 32.

With an arrangement of the elevator 28 and operating parts connected therewith, such as above described, by the throw of the lever 36, it is evident that the elevator may be raised or lowered, the link arms 29, 29 becoming vertical or horizontal at the extremes of the two movements. It is equally obvious that the elevator may be held rigidly in position at any point in its rise or fall, by permitting the detent 37 to holdingly engage the teeth 38. It will be understood that at the beginning of the operation, the elevator 28 is raised to its highest elevation, the eggs being delivered in the box C at the bottom thereof. As the cells in each filler are supplied, the lever 36 is shifted to lower the elevator 28, and the box mounted thereon, sufficiently to permit the introduction of the next added filler. This operation is continued for each successive layer of eggs, until at the completion of the packing the elevator is lowered to the position substantially as shown in Fig. 1 of the drawings.

In the operation of the machine, there is delivered at each rotation of the roller 10, as many eggs as there are cells B, B, extending across the filler in the box. It becomes necessary that the box C should be shifted lengthwise to present the successive rows of cells B, B, for the reception of the successive deliveries of eggs from the roller 10. This action is accomplished by means of a pawl 40, which is mounted on the table 25. The pawl 40 is provided with a head 41, adapted to engage the ratchet teeth 42 fixedly secured upon the upper surface of the table 25. The pawl 40 is mounted in guides 43, 43, and is slidably connected by means of the collar 44, with the connecting rod 45. The connecting rod 45 joins the free arms of the bell cranks 46, 46. The opposite arms of the bell cranks are likewise connected by means of the rod 47. The bell cranks are thus connected to rock in unison with one of the cranks connected to the rod 48, by means of which the two bell cranks are rocked to carry the rod 45 toward and away from the table 25, and cause the pawl 40, carried thereby, to successively engage the ratchet teeth 42. When the pawl 40 is drawn by the rocking of the levers 46, 46, toward the standing frame of the platform 11, the table 25, and box carried thereon, are moved on the tracks 27 under the ends of the wires 17 and rods 18, to present the next succeeding row of cells B, B, of the filler contained within the box C.

The rod 48 to which the upper of the levers 46, 46, is attached, is pivotally mounted upon the face of the gear wheel 14. The pivotal mounting produces a crank-like effect upon the rod 48, sufficient to rock the levers 46, 46, to advance and recede the pawl 40 in the manner above described. One complete reciprocation of the rod 48 is effected by each rotation of the roller 10. In this manner are the eggs A delivered row by row to the cells B, B, of the filler within the box C.

The rotation of the rollers 9, 10, is effected by the foot pedal 49, which is pivotally mounted upon the standards 50, set up from the rail 32. The pedal 49 is connected by means of the rod 51 with the gear wheel 14 mounted upon the roller 9. At the opposite extremity of the roller 9 is mounted a suitable fly wheel 52, whereby the action of the roller is steadied, and carried over the dead center of the rod 51.

With a machine constructed as above described, the operation is as follows: The eggs are deposited en masse at the upper end of the platform 11, and permitted to roll therefrom over the screen formed by the wires 12, to the lower end of the platform 11, where they are delivered to the rollers 9, 10, passing over the roller 9, and resting between the same, over the openings 8, 8. Necessary care is taken that the feed shall not crowd sufficiently to fracture the shells of the eggs by impact, the one upon the other. The operator stands at the position indicated by the foot pedal 49, and the lever 36. In this position, he glances at the row of eggs, when held in the openings 8, 8, above the reflected light carried from the lamps 7. Any discoloration or opacity in the egg is indicative of the condition of the same. A faulty or bad egg is immediately removed, the operator having his hands free for such purpose. The bad egg is replaced by a good one, and the operation continued. At every pressure exerted upon the pedal 49, the roller 10 is rotated one complete revolution, presenting the extensions 16 under the eggs resting in the openings 8, 8, and delivering the same to the passageways formed by the wires 17, 17.

Before feeding the eggs as above described, there has been placed on the table 25 the box C. The elevator has been manipulated by drawing upon the lever 36, until the link arms 29, 29 have assumed a position as nearly vertical as is required to place the bottom of the box, with the first filler therein, upon the passageways formed by the wires 17, and rods 18. The table 25 has been placed in position, so that the first of the rows of the fillers is presented below the passageways formed by the said wires and rods, or in other words in the position shown in Fig. 3 of drawings.

With the delivery of the first row of eggs above described, the wheel 14 of the roller 10 has been rotated to reciprocate the rod 48, which in turn rocks the levers 46, 46, to advance and recede the rod 45 connected therewith. The rod 45 being thus moved, reciprocates the pawl 40 so that the same is advanced to engage the succeeding ratchet 42 to shift the table 25 in such manner as to present the next succeeding or second row of cells B, B, of the filler. The eggs A, being constantly fed upon the table, the operator continues to operate the pedal 49, so that the succeeding rows of eggs are passed over the openings 8, 8, inspected, delivered to the passageways and into the cells of the filler in the box C, without interruption, until the last row of cells is presented under the said passageways. Here the machine is arrested, while the elevator 28 is lowered to permit the introduction of the next succeeding filler. The pawl 40 is raised and the table 25 retreated to the extreme of its outer position, to place the first row of the next filler into position under the said passageways. This having been accomplished, the machine is in operation to duplicate the action above described, until the second filler is supplied with eggs. When this is accomplished the operation is again repeated. This action continues, until the entire box is filled.

If the box be in the nature of a two-compartment box, the first half of the same is packed and then the box is reversed in its position, upon the table 25.

Having thus described my invention, I claim as new and desire to secure by Letters Patent:—

1. An egg candling and packing machine comprising a delivery device having orifices serially arranged; illuminating means for passing light rays through said orifices; means for arresting the eggs in said orifices; a series of delivery guides having contracted delivery ends; means for gradually distending the delivery ends; and means for dislodging said eggs from said orifices, serially.

2. An egg candling and packing machine comprising a delivery device having orifices serially arranged; illuminating means for passing light rays through said orifices; means for arresting the eggs in said orifices; a series of delivery guides having yielding sides contracted gradually to the delivery ends thereof; means for gradually distending the delivery ends; and means for dislodging said eggs from said orifices, serially.

3. An egg candling and packing machine comprising a delivery device having orifices serially arranged; illuminating means for passing light rays through said orifices; means for arresting the eggs in said orifices; a series of delivery guides constructed from resilient wire; pivotal mountings for a part of said wires; means for rocking the said wires on said pivotal mountings; and means for dislodging said eggs from said orifices serially.

4. An egg candling and packing machine comprising a delivery conveyer; rotary members having alined hollow peripheries to form orifices to hold said eggs; illuminating means for passing light rays through said orifices; means for arresting the eggs in said orifices; means for delivering the eggs to a packing case; a series of delivery guides having contracted delivery ends; means for gradually distending the delivery ends; and means for dislodging said eggs from said orifices serially.

5. An egg candling and packing machine comprising a conveyer; a plurality of rotary devices mounted in pairs and having hollow peripheries to form orifices to hold the eggs; extensions mounted on one of said rotary devices to raise and deliver the eggs from the said orifices; illuminating means for passing light rays through said orifices; means for arresting the eggs in said orifices; a series of delivery guides having contracted ends; means for gradually distending the delivery ends; and means for dislodging said eggs from said orifices serially.

6. An egg candling and packing machine comprising a conveyer; a plurality of rotary devices mounted in pairs and having hollow peripheries to form orifices to hold the eggs; means for rotating the said rotary devices in unison and in the same rotary direction; extensions mounted on one of said rotary devices to raise and deliver the eggs from the said orifices; illuminating means for passing light rays through said orifices; means for arresting the eggs in said orifices; a series of delivery guides having contracted ends; means for gradually distending the delivery ends; and means for dislodging said eggs from said orifices serially.

7. An egg candling and packing machine comprising a conveyer; a plurality of rollers the sides whereof are grooved to form a series of orifices adapted to arrest and hold the eggs when received from said conveyer; means for rotating the said rollers in unison and in the same rotary direction; illuminating means for passing light rays through said orifices; a series of delivery guides having contracted ends; means for gradually distending the delivery ends; and means for dislodging the said eggs from said orifices serially.

8. An egg candling and packing machine comprising a conveyer; a plurality of rollers, the sides whereof are grooved to form a series of orifices adapted to arrest and hold the eggs when received from said conveyer; means for rotating the said rollers in unison and in the same rotary direction; illuminating means for passing light rays through said orifices; extensions mounted in one of said rollers and adapted to pass through said orifices to elevate the eggs therefrom; a series of delivery guides having contracted ends; means for gradually distending the delivery ends; and means for dislodging said eggs from said orifices serially.

9. An egg candling and packing machine comprising an inclined platform having a screen section interposed between the receiving and delivery ends thereof; a plurality of rollers the sides whereof are grooved to form a series of orifices adapted to arrest and hold the eggs when received from said inclined platform; means for rotating the said rollers in unison and in the same rotary direction; illuminating means for passing light rays through said orifices; extensions mounted in one of said rollers and adapted to pass through said orifices to elevate the eggs therefrom; a series of delivery guides having contracted ends; means for gradually distending the delivery ends; and means for dislodging said eggs from said orifices serially.

10. An egg candling and packing machine comprising a delivery device having orifices serially arranged; a box-like receptacle disposed below said orifices to form a light screen therefor; a lighting device disposed in said receptacle; reflectors arranged in said receptacle to deflect the light from said lighting device through each of said orifices; means for arresting the eggs in said orifices; means for delivering the eggs to a packing case; a series of delivery guides having contracted delivery ends; means for gradually distending the delivery ends; and means for dislodging said eggs from said orifices serially.

11. An egg candling and packing machine comprising a conveyer; a plurality of rotary devices mounted in pairs and having hollow peripheries to form orifices to hold the eggs; extensions mounted on one of said rotary devices to raise and deliver the eggs from the said orifices; a box-like receptacle disposed below said orifices to form a light screen therefor; a lighting device disposed in said receptacle; reflectors arranged in said receptacle to deflect the light from said lighting devices through each of said orifices; means for arresting the eggs in said orifices; a series of delivery guides having contracted ends; means for gradually distending the delivery ends; and means for dislodging said eggs from said orifices serially.

12. An egg candling and packing machine comprising a conveyer; a plurality of rotary devices mounted in pairs and having hollow peripheries to form orifices to hold the eggs; means for rotating the said rotary devices in unison and in the same rotary direction; extensions mounted on one of said rotary devices to raise and deliver the eggs from the said orifices; a box-like receptacle disposed below said orifices to form a light screen therefor; a lighting device disposed in said receptacle; reflectors arranged in said receptacle to deflect the light from said lighting device through each of said orifices; means for arresting the eggs in said orifices; a series of delivery guides having contracted ends; means for gradually distending the delivery ends; and means for dislodging said eggs from said orifices serially.

13. An egg candling and packing machine comprising a conveyer; a plurality of rollers the sides whereof are grooved to form a series of orifices adapted to arrest and hold the eggs when received from said conveyer; means for rotating the said rollers in unison and in the same rotary direction; a box-like receptacle disposed below said orifices to form a light screen therefor; a lighting device disposed in said receptacle; reflectors arranged in said receptacle to deflect the light from said lighting device through each of said orifices; a series of delivery guides having contracted ends; means for gradually distending the delivery ends; and means for dislodging the said eggs from said orifices serially.

14. An egg candling and packing machine comprising a conveyer; a plurality of rollers, the sides whereof are grooved to form a series of orifices adapted to arrest and hold the eggs when received from said conveyers; means for rotating the said rollers in unison and in the same rotary direction; a box-like receptacle disposed below said orifices to form a light screen therefor; a lighting device disposed in said receptacle; reflectors arranged in said receptacles to deflect the light from said lighting device through each of said orifices; extensions mounted in one of said rollers and adapted to pass through said orifices to elevate the eggs therefrom; a series of delivery guides having contracted ends; means for gradually distending the delivery ends; and means for dislodging said eggs from said orifices serially.

15. An egg candling and packing machine comprising a delivery device having orifices serially arranged; illuminating means for passing light rays through said orifices; means for arresting the eggs in said orifices; a series of delivery guides having contracted delivery ends; means for gradually distending the delivery ends; means for dislodging said eggs from said orifices serially; a receptacle for said eggs having rows of receiving cells; a table for holding the packing receptacle to present the cells thereof in rows; and means for shifting the said receptacle to present succeeding rows.

16. An egg candling and packing machine comprising a conveyer; a plurality of rotary devices mounted in pairs and having hollow peripheries to form orifices to hold the eggs; extensions mounted on one of said rotary devices to raise and deliver the eggs from the said orifices; illuminating means for passing light rays through said orifices; means for arresting the eggs in said orifices; a series of delivery guides having contracted ends; means for gradually distending the delivery ends; means for dislodging said eggs from said orifices serially; a receptacle for said eggs having rows of receiving cells; a table for holding the packing receptacle to present the cells thereof in rows; and means for shifting the said receptacle to present succeeding rows.

17. An egg candling and packing machine comprising a conveyer; a plurality of rotary devices mounted in pairs and having hollow peripheries to form orifices to hold the eggs; means for rotating the said rotary devices in unison and in the same rotary direction; extensions mounted on one of said rotary devices to raise and deliver the eggs from the said orifices; illuminating means for passing light rays through said orifices; means for arresting the eggs in said orifices; a series of delivery guides having contracted ends; means for gradually distending the delivery ends; means for dislodging said eggs from said orifices serially; a receptacle for said eggs having rows of receiving cells; a table for holding the packing receptacle to present the cells thereof in rows; and means for shifting the said receptacle to present succeeding rows.

18. An egg candling and packing machine comprising a conveyer; a plurality of rollers the sides whereof are grooved to form a series of orifices adapted to arrest and hold the eggs when received from said conveyer; means for rotating the said rollers in unison and in the same rotary direction; illuminating means for passing light rays through said orifices; a series of delivery guides having contracted ends; means for gradually distending the delivery ends; means for dislodging the said eggs from said orifices serially; a receptacle for said eggs having rows of receiving cells; a table for holding the packing receptacle to present the cells thereof in rows; and means for shifting the said receptacle to present succeeding rows.

19. An egg candling and packing machine comprising a delivery device having orifices serially arranged; illuminating means for passing light rays through said orifices; means for arresting the eggs in said orifices; a series of delivery guides having contracted delivery ends; means for gradually distending the delivery ends; means for dislodging said eggs from said orifices serially; a receptacle for said eggs having rows of receiving cells; a table for holding the packing receptacle to present the cells thereof in rows; means for shifting the said receptacle to present succeeding rows; and means for elevating said table to receive successive layers of said eggs.

20. An egg candling and packing machine comprising a conveyer; a plurality of rotary devices mounted in pairs and having hollow peripheries to form orifices to hold the eggs; extensions mounted on one of said rotary devices to raise and deliver the eggs from the said orifices; illuminating means for passing light rays through said orifices; means for arresting the eggs in said orifices; a series of delivery guides having contracted ends; means for gradually distending the delivery ends; means for dislodging said eggs from said orifices serially; a receptacle for said eggs having rows of receiving cells; a table for holding the packing receptacle to present the cells thereof in rows; means for shifting the said receptacle to present succeeding rows; and means for elevating said table to receive successive layers of said eggs.

21. An egg candling and packing machine comprising a conveyer; a plurality of rotary devices mounted in pairs and having hollow peripheries to form orifices to hold the eggs; means for rotating the said rotary devices in unison and in the same rotary direction; extensions mounted on one of said rotary devices to raise and deliver the eggs from the said orifices; illuminating means for passing light rays through said orifices; means for arresting the eggs in said orifices; a series of delivery guides having contracted ends; means for gradually distending the delivery ends; means for dislodging said eggs from said orifices serially; a receptacle for said eggs having rows of receiving cells; a table for holding the packing receptacle to present the cells thereof in rows; means for shifting the said receptacle to present succeeding rows; and means for elevating said table to receive successive layers of said eggs.

22. An egg candling and packing machine comprising a conveyer; a plurality of rollers the sides whereof are grooved to form a series of orifices adapted to arrest and hold the eggs when received from said conveyer; means for rotating the said rollers in unison and in the same rotary direction; illuminating means for passing light rays through said orifices; a series of delivery guides having contracted ends; means for gradually distending the delivery ends; means for dislodging the said eggs from said orifices serially; a receptacle for said eggs having rows of receiving cells; a table for holding the packing receptacle to present the cells thereof in rows; means for shifting the said receptacle to present succeeding rows; and means for elevating said table to receive successive layers of said eggs.

In testimony whereof I have signed my name to this specification in the presence of two subscribing witnesses.

HENRY PIEPER.

Witnesses:
FRED J. UEHLING,
G. H. HEINEMANN.